United States Patent [19]

Iwata et al.

[11] Patent Number: 5,212,641
[45] Date of Patent: May 18, 1993

[54] REAR WHEEL STEERING CONTROL SYSTEM FOR VEHICLE

[75] Inventors: Toru Iwata; Takashi Imaseki; Minoru Tamura; Yuichi Fukuyama, all of Kanagawa, Japan

[73] Assignee: Nissan Motor Company, Limited, Japan

[21] Appl. No.: 586,604

[22] Filed: Sep. 24, 1990

[30] Foreign Application Priority Data

Sep. 25, 1989 [JP] Japan ................. 1-249447

[51] Int. Cl.⁵ ................................ B62D 6/02
[52] U.S. Cl. .................... 364/424.05; 364/426.02; 180/140; 180/142; 180/197
[58] Field of Search ............ 364/424.05, 426.02; 180/197, 79.1, 140–143; 280/91; 303/96, 103

[56] References Cited

U.S. PATENT DOCUMENTS

| | | | |
|---|---|---|---|
| 4,840,243 | 6/1989 | Hirabayashi et al. | 180/142 |
| 4,866,625 | 9/1989 | Kawamoto et al. | 364/426.02 |
| 4,926,955 | 5/1990 | Ohmura et al. | 180/140 |
| 4,934,474 | 6/1990 | Sugasawa | 180/140 |
| 4,941,095 | 7/1990 | Imaseki et al. | 180/140 |
| 4,949,261 | 8/1990 | Ito et al. | 180/142 |
| 4,967,865 | 11/1990 | Schindler | 180/140 |
| 4,971,174 | 11/1990 | Abe et al. | 180/140 |
| 4,998,593 | 3/1991 | Karnopp et al. | 180/142 |
| 5,089,967 | 2/1992 | Haseda et al. | 364/426.02 |

FOREIGN PATENT DOCUMENTS

| | | |
|---|---|---|
| 62-71761 | 4/1987 | Japan . |
| 62-149545 | 7/1987 | Japan . |
| 63-166664 | 7/1988 | Japan . |

*Primary Examiner*—Gary Chin
*Attorney, Agent, or Firm*—Lowe, Price, LeBlanc & Becker

[57] ABSTRACT

A rear wheel steering control system is provided. This system includes a traction control system which is responsive to generation of a difference in rotational speeds between front and rear wheels to recover traction of driven wheels and a compensating system which corrects a rear wheel steering angle, determined in a preselected relation to vehicle speed and a steered angle of the front wheels, based on the difference in rotational speeds between the front and rear wheels to provide a proper rear wheel target steering angle. The system restricts operation of the compensating system during operation of a traction control system to prevent a hunting frequency thereof from affecting the operation of the compensating system.

50 Claims, 4 Drawing Sheets

REAR WHEEL STEERING CONTROL SYSTEM FOR VEHICLE

BACKGROUND OF THE INVENTION

1. Technical Field

The present invention relates generally to a steering control system for a vehicle. More particularly, the invention relates to an improved rear wheel steering control system suitable for a vehicle in which a traction control system (TCS) is incorporated.

2. Background Art

A Japanese Patent First Publication No. 62-149545 discloses a traction control system for a vehicle. This system is adapted for adjusting engine output or braking to control driving torque so that over torque of driven wheels is reduced to provide rotational speeds of the driven wheels greater than that of compliance wheels by a certain percent in response to over a gripping force thereof, i.e., rotational speeds of the driven wheels greater than those of the compliance wheels, thereby effectively improving an initial acceleration characteristics.

A Japanese Patent First Publication No. 62-71761 discloses a four-wheel steering (4WS) system for a vehicle. This system determines a rear wheel steering angle in a preselected relation to a vehicle speed and a steered angle of front wheels and compensates the rear wheel steering angle based on a difference in rotational speeds between the front and rear wheels to enhance a turning limitation, preventing spin and/or drift-out from occurring.

It will be appreciated that a combination of these two systems provide advantages in initial accelerating ability (TCS) and turning stability (4WS) to significantly improve vehicle performance.

However, in a case of the simple combination of the above technologies, a rear wheel steering angle sometimes varies minutely due to control of the TCS with the result that a driver feels uncomfortable during a steering operation.

For example, the TCS is operable to be responsive to detection of driven wheel slippage to close a sub-throttle valve of an engine so as to reduce engine output while restricting driven wheel torque, preventing driven wheel slippage from occurring. By repeating a series of such controls, wheel traction is recovered. Closing and opening operations of the sub-throttle valve are effected by a preselected cycle. This cycle (i.e., a hunting frequency) is set to 1 to 2 Hz for suitable control response.

The 4WS system is operable to be responsive to generation of a difference in rotational speeds between driven and compliance wheels (i.e., slippage) to compensate a rear wheel steering angle precisely. Since the difference in rotational speeds during operation of the TCS varies minutely, caused by synchronizing with the hunting frequency (1 to 2 Hz) compensation tends to vary minutely. Additionally, as the hunting frequency is sufficiently greater than a frequency of normal driving operation by a driver (the typical driving operation is about 0.3 Hz), undesired vehicle motion occurs, causing uncomfortable steering operation for the driver.

SUMMARY OF THE INVENTION

It is accordingly one object of the present invention to avoid the disadvantages of the prior art.

It is another object of the invention to provide a rear wheel steering control system which is adapted for restricting correction, based on a difference in rotational speeds between front and rear wheels, for determining a rear wheel steering angle, preventing a hunting frequency of the TCS from affecting rear wheel steering control.

According to one aspect of the present invention, there is provided a rear wheel steering control system for a vehicle which comprises a first means for monitoring a steered angle of front wheels to provide a signal indicative thereof, a second means including sensors which monitor rotational speeds of wheels to determine a difference in rotational speeds between the front and rear wheels and a vehicle speed to provide signals indicative thereof, a third means for determining a rear wheel steering angle based on the steered angle of the front wheels and the vehicle speed to provide a signal indicative thereof, a fourth means for compensating the rear wheel steering angle determined by the third means based on the difference in rotational speeds between the front and rear wheels to provide a rear wheel target steering angle, a fifth means responsive to the difference in rotational speeds between the front and rear wheels greater than a preselected reference value to control traction of driven wheels so as to compensate the difference in rotational speeds between the front and rear wheels, a sixth means responsive to operation of the fifth means to restrict the compensating operation of the fourth means and providing the rear wheel steering angle determined by the third means as the rear wheel target steering angle, and a seventh means for controlling an actual steering angle of the rear wheel according to the rear wheel target steering angle.

According to another aspect of the invention, the the stated objects thereof can be achieved by providing a rear wheel steering control system for a vehicle which comprises a first means for monitoring a steered angle of front wheels to provide a signal indicative thereof, a second means including sensors which monitor rotational speeds of wheels to determine a difference in rotational speeds between the front and rear wheels and a vehicle speed to provide signals indicative thereof, a third means for determining a rear wheel steering angle in a preselected relation to the steered angle of the front wheels and the vehicle speed to provide a signal indicative thereof, a fourth means responsive to generation of a difference in rotational speeds between the front and rear wheels to provide a correction value for the rear wheel steering angle determined by the third means in a preselected relation to a degree of difference in rotational speeds between the front and rear wheels and providing a rear wheel target steering angle, a fifth means for controlling traction of driven wheels so as to compensate the difference in rotational speeds between the front and rear wheels when a value representing the difference in rotational speeds between the front and rear wheels is greater than a reference value, a sixth means for holding the correction value to zero during traction control of driven wheels by the fifth means, and a seventh means for controlling an actual steering angle of the rear wheel according to the rear wheel target steering angle.

According to a further aspect of the invention, there is provided a combination of a rear wheel steering control system and a traction control system for a vehicle which comprises a first means for monitoring a steered angle of front wheels to provide a signal indicative thereof, a second means including sensors which monitor rotational speeds of wheels to determine a difference in rotational speeds between the front and rear wheels and a vehicle speed to provide signals indicative thereof, a third means for determining a rear wheel steering angle based on the steered angle of the front wheels and the vehicle speed to provide a signal indicative thereof, a fourth means for compensating the rear wheel steering angle determined by the third means based on the difference in rotational speeds between the front and rear wheels to provide a rear wheel target steering angle, a fifth means responsive to the difference in rotational speeds between the front and rear wheels greater than a preselected reference value to restrict the compensating operation of the fourth means and providing the rear wheel steering angle determined by the third means as the rear wheel target steering angle, and a sixth means for controlling an actual steering angle of the rear wheel according to the rear wheel target steering angle.

DESCRIPTION OF THE PREFERRED EMBODIMENT

Figure 1:
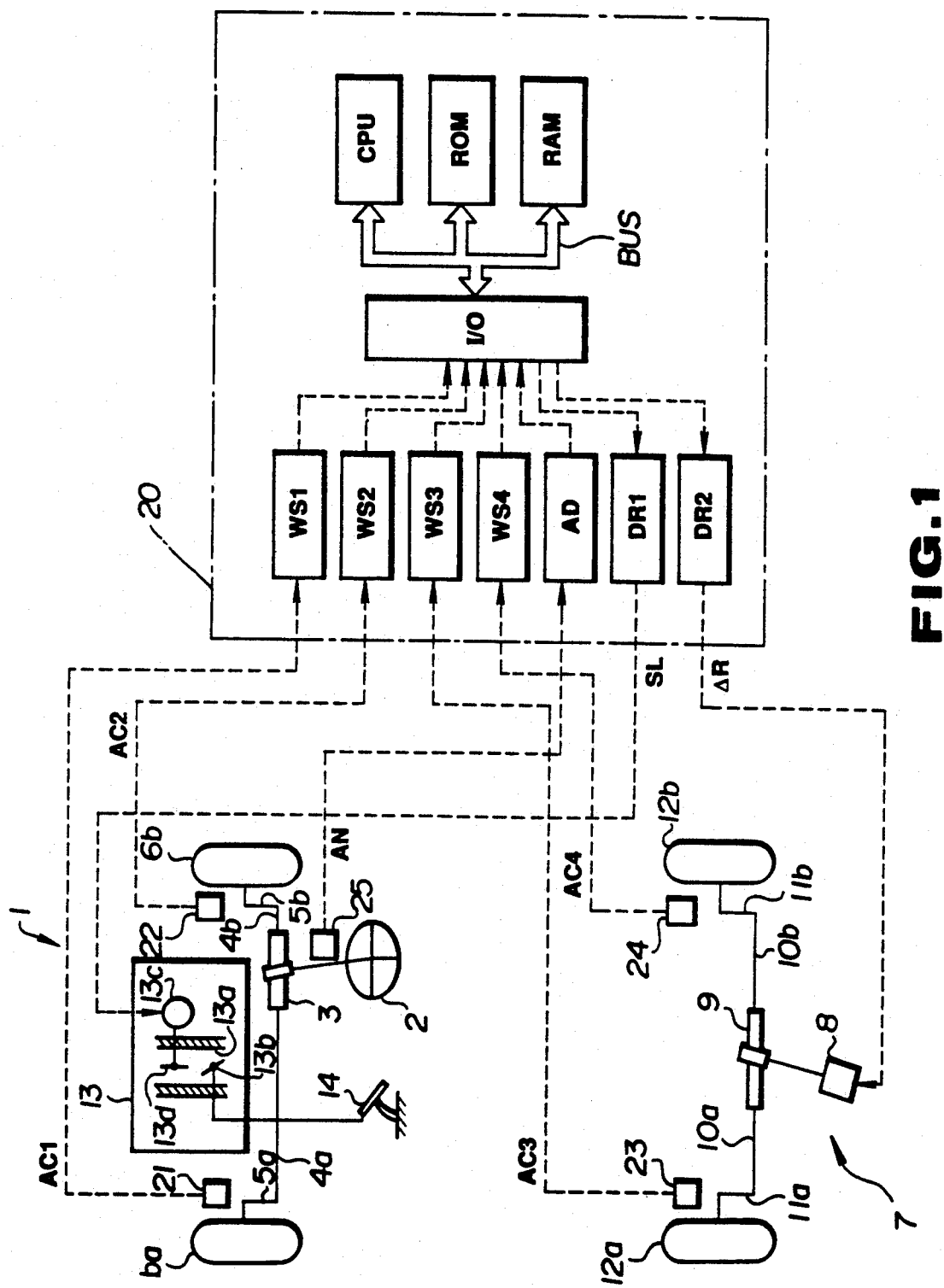
FIG. 1 is a block diagram which shows a steering control system according to the present invention incorporated in a front-wheel drive vehicle.

Referring now to the drawings, particularly to FIG. 1 a steering control system according to the present invention is shown which is incorporated in a front-wheel drive (FWD) vehicle. This system includes generally a front wheel steering unit 1, a rear wheel steering unit 7, and a steering controller 20 operable to determine a rear wheel target steering angle.

The front wheel steering unit 1 includes a steering wheel 2, a steering gear 3 such as a rack-and pinion, relay rods 4a and 4b, and knuckle arms 5a and 5b. The steering gear 3 serves to convert rotational motion of the steering wheel 2 into stroke motion to laterally displace the relay rods 4a and 4b for steering front wheels 6a and 6b.

The rear wheel steering unit 7 includes a stepping motor 8, a steering gear 9, relay rods 10a and 10b, and knuckle arms 11a and 11b. The stepping motor 8 provides rotational torque to the steering gear 9 to convert it into stroke motion for steering the rear wheels 12a and 12b.

An engine 13 is provided which includes an intake pipe 13a having a main throttle valve 13b and a sub-throttle valve 13d. The main throttle valve 13b is responsive to depression of an acceleration pedal 14 to open and close. The sub-throttle valve 13d is operated by a sub-actuator 13c to control an opening ratio of the intake pipe 13a.

The steering controller 20 includes wave-shaping circuits WS1, WS2, WS3, and WS4, an analog/digital converter (i.e., an AD converter), drivers DR1 and DR2, an input/output interface (I/O interface), a CPU, ROM, RAM, and a bus electrically connecting the CPU, the ROM, the RAM, and the I/O interface.

The system further includes rotational speed sensors 21, 22, 23, 24, and a steering angle sensor 35. The rotational speed sensors provide alternate signals AC1, AC2, AC3, AC4, which have frequencies corresponding to rotational speeds of the front left and right wheels 6a and 6b and the rear left and right wheels 12a and 12b, to the corresponding wave-shaping circuits of the controller 20 respectively. The wave-shaping circuits WS1, WS2, WS3, and WS4 then shape the signals AC1, AC2, AC3, AC4 output from rotational speed sensors into digital pulse signals. The steering angle sensor 35 monitors a turning angle of the steering wheel 2 to provide an analog signal AN indicative of a steered angle of the front wheels to the AD converter, and is converted into a digital signal.

The driver DR1 outputs a driving signal SL to the sub-actuator 13c to control the opening of the sub-throttle valve. This driving signal has a pulse frequency which corresponds to a sub-throttle opening control value $(\phi_t)$ as will be described hereinafter in detail. The driver DR2 outputs a rear wheel steering driving signal AR which has a pulse frequency corresponding to a rear wheel steering control value, or rear wheel target steering angle $(\theta_r)$ as will be described hereinafter. The CPU is operable to carry out a program stored in the ROM to determine the sub-throttle opening control value $(\phi_t)$ for compensating a difference in rotational speeds between driven and compliance wheels (i.e., driven wheel slippage) and/or a rear wheel steering control value $(\theta_r)$ based on the signals from the circuits WS1, WS2, WS3, and WS4 and then outputs signals representing these values to drivers DR1 and DR2 through the I/O interface during every steering control cycle.

Figure 2:
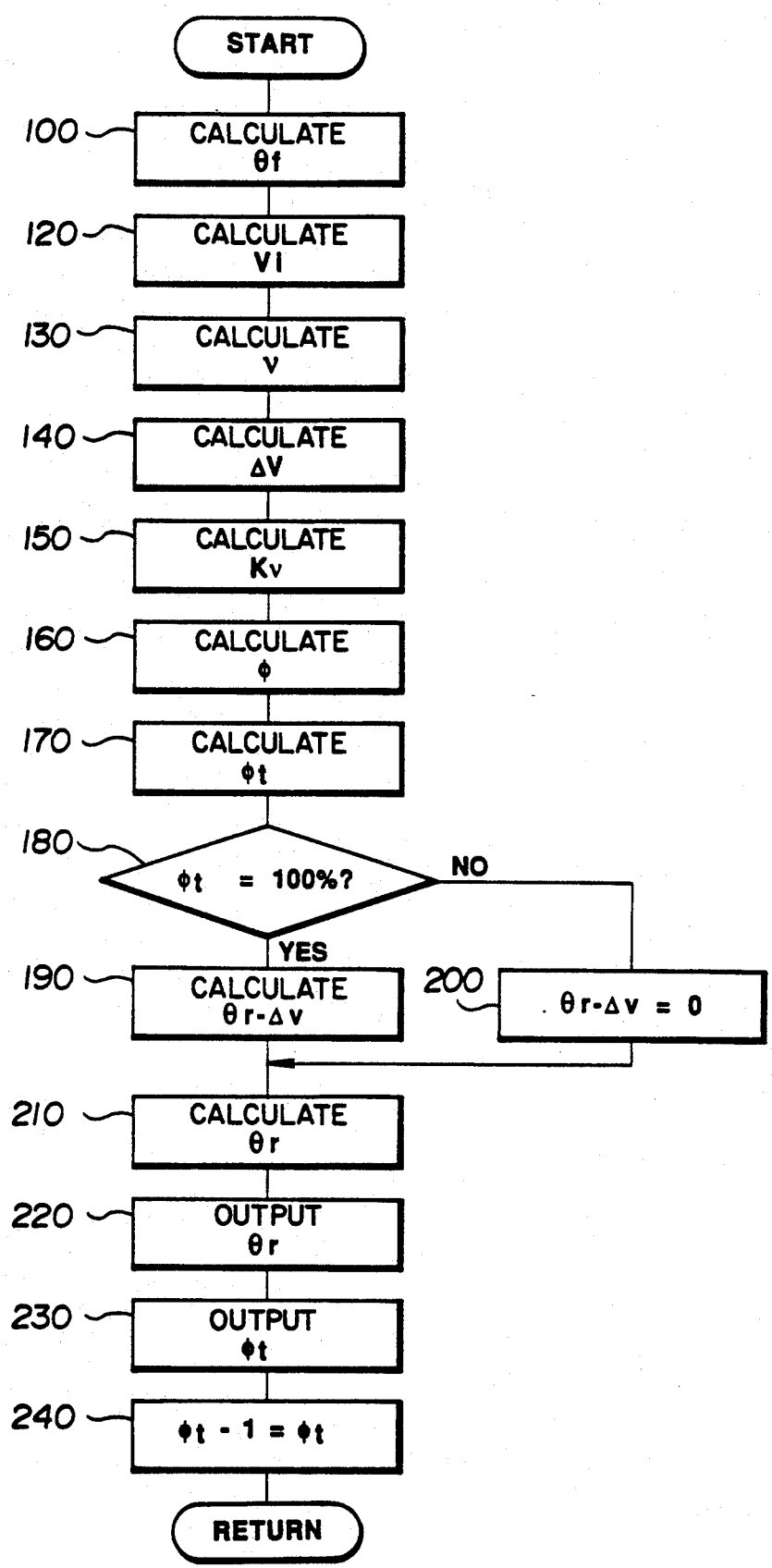
FIG. 2 is a flowchart which shows a sequence of logical steps carried out by a rear wheel steering control system of the invention.

Referring to FIG. 2, a flowchart of a program or sequence of logical steps performed by the steering controller 20 is shown. This program is carried out in every steering control cycle.

After entering the program, the routine proceeds to step 100 wherein the steering controller 20 is responsive to a signal from the AD converter or signal indicative of a turning angle of the steering wheel 2 to determine a steered angle of the front wheels $\theta_f$.

The routine then proceeds to step 120 wherein the steering controller receives signals from the wave-shaping circuits WS1 to WS4 or signals representing rotational speeds of the front wheels 6a and 6b and the rear wheels 12a and 12b respectively to mathematically calculate a rotational speed Vi of each wheel. Note that "i" represents 1 to 4, 1 denoting a left front wheel 6a, 2 denoting a right front wheel 6b, 3 denoting left rear wheel 12a, and 4 denoting a right rear wheel 12b.

The routine proceeds to step 130 wherein a vehicle speed V is determined according to the following equation.

$$V = (V_3 + V_4)/2 \tag{1}$$

The routine then proceeds to step 140 wherein a difference in rotational speeds (slippage) Av between the driven and compliance wheels is determined according to the following relation.

$$\Delta V = (V_1 + V_2)/2 \qquad (2)$$

Figure 3:
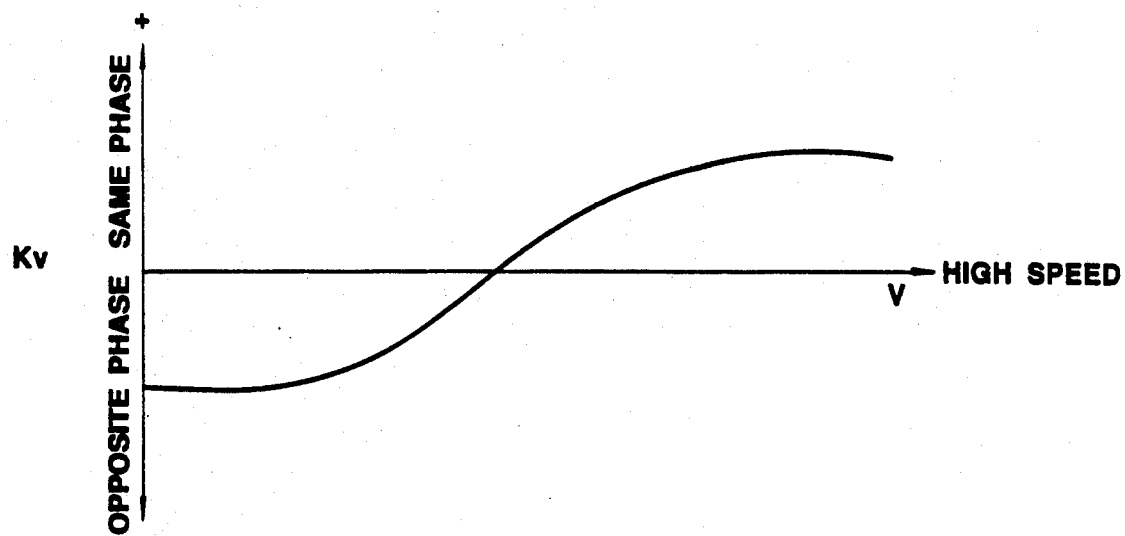
FIG. 3 is a table which is used for determining a correction value $K_v$ for a rear wheel steering angle dependent upon a vehicle speed.

The routine continues to step 150 wherein the steering controller 20 mathematically calculates a steering ratio Kv (Kv = f(v)) dependent upon the vehicle speed V. This calculation is made by looking up a table as shown in FIG. 3. The table shows a curve representing the steering ratio Kv variable so as to provide a steering ratio −Kv in a phase opposite a steered angle of the front wheels at low speed and a steering ratio +Kv in the same phase as that of the front wheels at intermediate and high speeds.

Subsequently, the routine proceeds to step 160 wherein the steering controller mathematically determines a correction $\phi$ for adjusting an opening of the sub-throttle valve based on the slippage $\Delta V$ derived in step 140 and a variation in the slippage $\Delta \dot{V}$ ($\Delta \dot{V} = \Delta V_{-1} - \Delta V$, the $\Delta V_{-1}$ representing a slippage $\Delta V$ one steering control cycle before). This determination is made based on a table as shown in FIG. 4.

Figure 4:
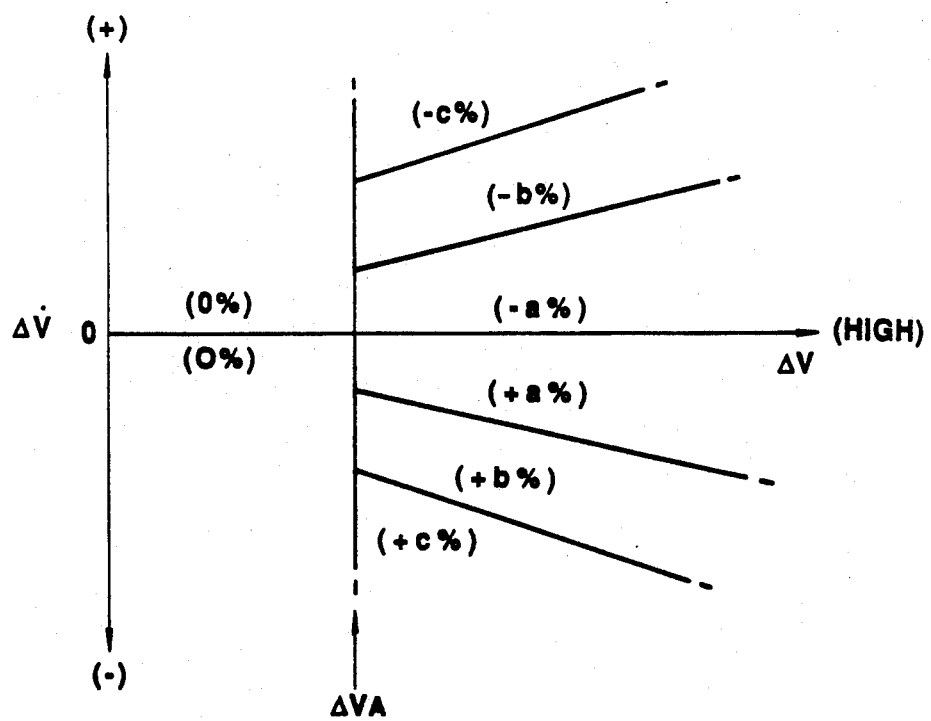
FIG. 4 is a table which is used for determining a correction value $\phi$ for adjusting an opening of a sub-throttle valve.

In FIG. 4, the vertical axis indicates the value of $\Delta \dot{V}$ (a positive value shows increase in slippage, while a minus value shows decrease in slippage). The horizontal axis indicates the value of $\Delta V$ (the value of $\Delta V$ increases toward the right side). The value of $\phi$ is set to zero % for a range of $\Delta V$ less than a reference value $\Delta V_A$; if the value of $\Delta V$ is greater than the $\Delta V_A$, one value of $\phi$ is selected from among +a%, +b%, +c%, −a%, −b%, and −c% in a relation between the values of $\Delta V$ and $\Delta \dot{V}$ at that time to set it as the sub-throttle valve opening control correction $\phi$. The curves or characteristics of the table are defined by the following relation.

$$\dot{\phi} = g(\Delta V, \Delta \dot{V}) \qquad (3)$$

where $0 < a < b < c$

Therefore, according to the table as shown in FIG. 4, the throttle valve opening control correction $\phi$ for adjusting the opening of the sub-throttle valve is set to zero before the slippage $\Delta V$ at that time is greater than the reference value $\phi V_A$.

After determining the correction $\phi$ in the above manner, the routine proceeds to step 170 wherein a sub-throttle valve opening control value $\phi_t$ is determined by the following equation.

$$\phi_t = \phi_{t-1} + \phi \qquad (4)$$

where the $\phi_{t-1}$ represents a value $\phi_t$ one steering control cycle before and an initial value $\phi_{t-1}$ is 100%. The correction value $\phi$ when no slippage occurs is set to 0% and thus the $\phi_t$ is given by a relation of 100% + 0% = 100%, resulting in a fully opened sub-throttle valve. On the other hand, if the slippage $\Delta V$ is greater than the reference value $\Delta V_A$, the correction value $\phi$ is first set to any one of −a%, −b%, and −c% to be added with the $\phi_{t-1}$ obtaining the sub-throttle valve opening control value $\phi_t$. As a result, the sub-throttle valve is closed by a selected degree from a fully opened status.

The routine proceeds to decision step 180 wherein it is determined as to whether the $\phi_t$ is 100% or not. If a YES answer is obtained, it is concluded that a traction control system (TCS) is not operated. The routine then proceeds to step 190 wherein a correction value $\theta_{r-\Delta v}$ for a rear wheel steering angle in view of slippage (or rear wheel steering angle slippage correction) is mathematically calculated according to the following equation.

$$\phi_{r-\Delta v} = h(\Delta V, V) \qquad (5)$$

If a NO answer is obtained or the $\Delta V$ is greater than the $\Delta V_A$, it is concluded that the TCS is operated to throttle the sub-throttle valve so as to control engine output. The routine then proceeds to step 200 wherein slippage, corresponding rear wheel steering angle correction value $\theta_{r-\Delta v}$, is held to zero (i.e., $\theta_{r-\Delta v} = 0$).

Figure 5:
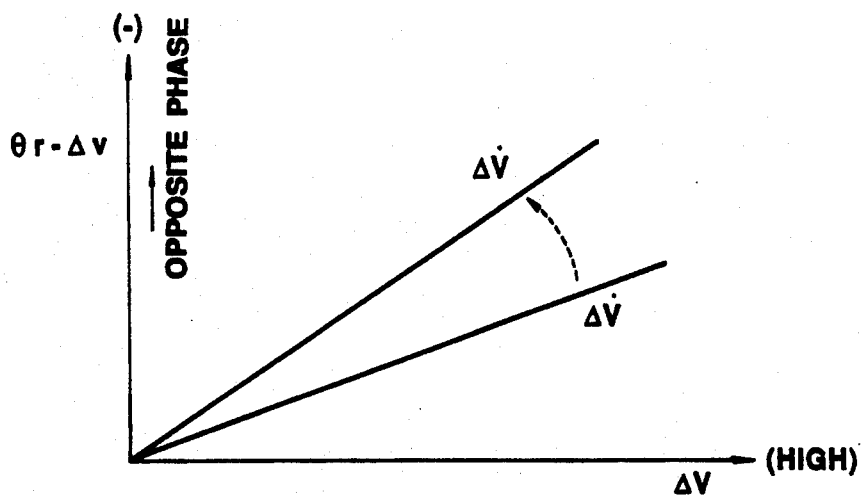
FIG. 5 is a table which is used for determining a correction value $\theta_{r\text{-}v}$ for a rear wheel steering angle dependent upon slippage of driven wheels.

The calculation of the rear wheel steering angle correction value $\theta_{r-\Delta v}$ when the TCS is not operated is made by referring a table as shown in FIG. 5. In this table, the vertical axis indicates a value representing the rear wheel steering angle correction value $\theta_{r-\Delta v}$, while the horizontal axis indicates a value representing the $\Delta V$. The table shows that correction $\theta_{r-\Delta V}$ to the opposite phase is increased as the $\Delta v$ or the $\Delta \dot{V}$ becomes great.

After obtaining the K$_v$, the $\theta_{r-\Delta v}$, and the $\theta_f$, the routine proceeds to step 210 wherein a rear wheel target steering angle $\theta_r$ is determined according to the following relation.

$$\theta_r = K_v \times \theta_f + \theta_{r-\Delta v} \qquad (6)$$

According to the above equation, if the vehicle speed V is higher and the front wheel steered angle $\theta_f$ is greater, a basic steering value of $(K_v \times \theta_f)$ which provides steering in the same phase is obtained, while if the slippage $\Delta \dot{V}$ and/or the variation in the slippage $\Delta V$ is greater, the rear wheel steering angle correction value $(\theta_{r-\Delta v})$ in the opposite phase is obtained. Thus, when a traveling condition tends to cause a slippage to occur, for example, the slippage is induced on driven wheels of a FWD vehicle to cause drift-out to be generated, the steering correction $(\theta_{r-\Delta v})$ serves to adjust the rear wheel target steering angle to the opposite phase to enhance yawing torque response for preventing drift-out from occurring, resulting in improved turning stability.

After obtaining the rear wheel target steering angle $\theta_r$, the routine proceeds to step 220 wherein the steering controller 20 provides a signal indicative of the rear wheel target steering angle $\theta_r$ to the driver DR$_2$ through the I/O interface. The driver DR$_2$ outputs a signal AR indicative of the $\theta_r$ to the stepping motor 8 to steer the rear wheels 12a and 12b in a selected direction.

Additionally, in step 230 the $\phi_t$ derived from step 70 is input to the driver DR1 to output a signal SL to the sub-actuator 13c. The sub-actuator controls the opening of the sub-throttle valve 13d according to the $\phi_t$.

The routine then proceeds to step 240 wherein the $\phi_{t-1}$ is replaced with the $\phi_t$ to finish the steering control cycle.

Since in the steering control program of the invention the $\phi_t$ is checked in step 80 and if the $\phi_t$ is less than or equal to 100%, it is concluded that the TCS is not operated to hold the $\theta_{r-\Delta v}$ to zero, no correction for the basic steering value $(K_v \times \theta_f)$ is made. It will be appreciated that the slippage $\Delta V$ variable synchronously with a hunting frequency (1 to 2 Hz) due to the operation of TCS does not interfere with determination of the rear wheel target steering angle $\theta_r$, therefore proper steering feeling is obtained.

Figure 6:
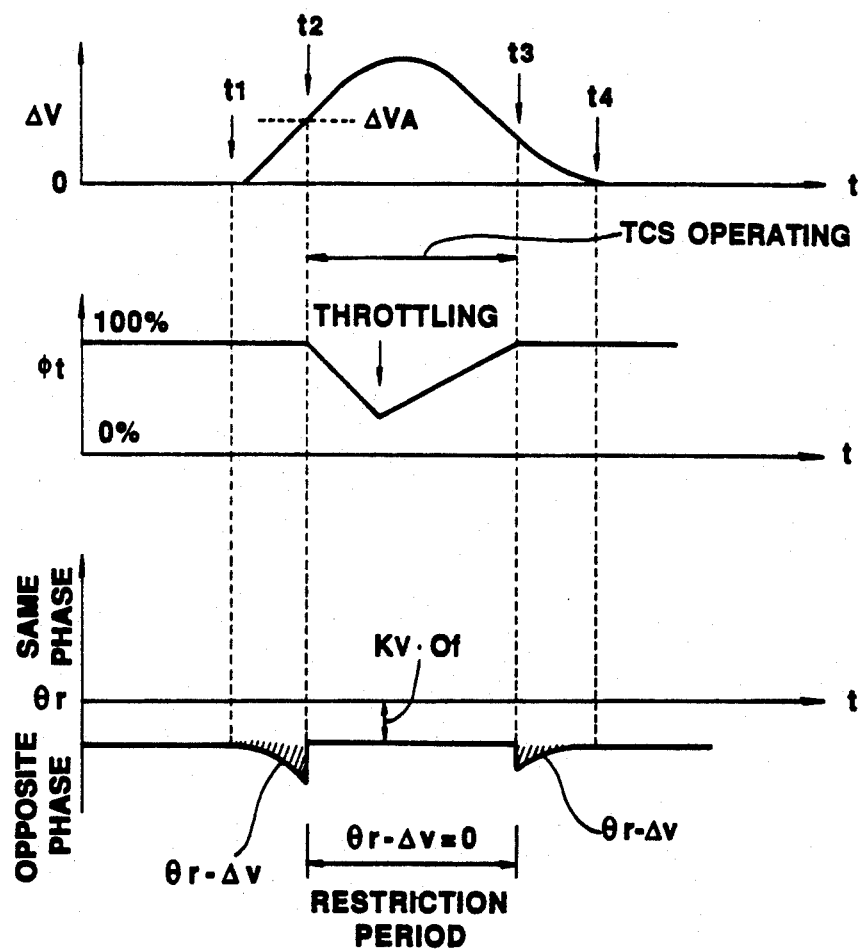
FIG. 6 is a timing chart which shows a sequential operation of a rear wheel steering control system of the invention.

Referring to FIG. 6, timing charts are shown which represent relations of slippage $\Delta V$, sub-throttle valve opening control value $\phi_t$, and rear wheel target steering angle $\theta_r$ relative the TCS. If a slippage occurs at a time $t_1$, the slippage $\Delta V$ is small within an initial period between times $t_1$ and $t_2$ in a relation of $\Delta V < \Delta V_A$ and the TCS is yet not operated. Within this $t_1$ to $t_2$ period, the rear wheel target steering angle $\theta_r$ is determined according to the equation (6) to adjust the basic control value ($K_v \times \theta_f$) based on the rear wheel steering angle correction value ($\theta_{r-\Delta v}$) dependent upon the slippage $\Delta V$ and the variation $\Delta \dot{V}$ in the slippage to provide the rear wheel target steering angle $\theta_r$. After the time $t_2$ and the $\Delta V$ becomes greater than the $\Delta V_A$, the TCS is operated and the correction value $\theta_{r-v}$ is held to zero in response to this operation. This correction value holding period or restriction period in which correction for a rear wheel target steering angle based on the slippage and the variation in slippage is restricted continues until the $\Delta V$ is less than the $\Delta V_A$. When the slippage is reduced by effect of the TCS and the $\Delta V_A$ becomes greater than the $\Delta v$, the restriction period terminates at a time $t_3$ and the correcting operation begins again to adjust the rear wheel target steering angle based on the slippage and variation in the slippage. Thus, when slippage is created at the beginning of turning, a rear wheel target steering angle to the opposite phase is momentarily provided to enhance response of yawing torque for improving turning stability. If the slippage increases, the correcting operation for the rear wheel steering angle is restricted in favor of the TCS to recover traction. This establishes a system incorporating both functions of four-wheel steering control system and a traction control system (TCS).

While the above embodiment is directed to a front-wheel drive vehicle and the tables and the equations suitable therefor are provided, the invention is further applicable to a rear-wheel drive vehicle.

Additionally, a value of $\theta_{r-\Delta v}$ is held to zero during TCS operation, however this value may be held to a value of $\theta_{r-\Delta v}$ of the previous control cycle for example. Although, according to the embodiment, in order to reduce driving torque of the TCS, the sub-throttle valve is provided to control engine output, fuel cut to the engine, retardation of ignition timing, interruption of firing, a leaner mixture, reduction of a gear ratio of a transmission, reduction of line pressure of an automatic transmission, variation of a limited slip differential characteristic, or brake operation which has a pressure source other than a pressure source operated by a driver may be used. Alternatively, a combination of these may be applicable.

In the above embodiment determination of the TCS operation is implemented by checking a value of the $\phi_t$, however, it may be made by directly monitoring signals of fuel cut, firing retardation, and firing cut.

Further, for determining a rear wheel target steering angle, the following equation may be applicable which takes a steered angular velocity of a steering wheel into account in addition to a steered angle of the steering wheel.

$$\theta_r = K \times \theta - T \times \dot{\theta}$$

where

K: $K' - \Delta K$

K': a coefficient of a reference characteristic of a rear wheel steering, variable according to vehicle speed $\theta$: a steered angle of a steering wheel $\dot{\theta}$: steering angular velocity of a steering wheel $\Delta K$: a correction for a rear wheel steering angle T: a coefficient variable dependent upon the vehicle speed The above equation is disclosed in a co-pending U.S. application filed on Aug. 30, 1990, entitled "REAR WHEEL STEERING CONTROL SYSTEM FOR VEHICLE" by Takashi Imaseki et al., assigned to NISSAN MOTOR CO., LTD, which corresponds to Japanese Patent Application No. 1-227075U.S. application Ser. No. 07/575,011, filed Aug. 30, 1990, the disclosure of which is incorporated herein by reference.

What is claimed is:

1. A rear wheel steering control system for a vehicle comprising:

first means for monitoring a steered angle of front wheels to provide a signal indicative thereof;

second means including sensors for monitoring rotational speeds of wheels for determining a difference in rotational speeds between the front and rear wheels and speed of the vehicle for deriving signals indicative thereof;

third means for determining a rear wheel steering angle based on the steered angle of the front wheels and the vehicle speed for deriving a signal indicative thereof;

fourth means for compensating the rear wheel steering angle determined by said third means based on the difference in rotational speeds between the front and rear wheels for deriving a rear wheel target steering angle;

fifth means responsive to the difference in rotational speeds between the front and rear wheels being greater than a preselected reference value for controlling traction of driven wheels so as to compensate the difference in rotational speeds between the front and rear wheels;

sixth means responsive to operation of said fifth means for restricting the compensating operation of said fourth means and deriving the rear wheel steering angle determined by said third means as the rear wheel target steering angle; and seventh means for controlling an actual steering angle of the rear wheel according to the rear wheel target steering angle.

2. A system as set forth in claim 1, wherein said fourth means derives the rear wheel target steering angle $\theta_r$ according to the following relation, $$\theta_r = K_v \times \theta_f + \theta_{4-\Delta v}$$

where Kv is a steering ratio of the rear wheel steering angle to the steered angle of the front wheels $\theta_f$ which is variable in a steering angle phase to that of $\theta_f$ dependent upon the vehicle speed and $\theta_{r-\Delta v}$ is a correction value for the rear wheel steering angle based on the difference in rotational speeds between the front and rear wheels.

3. A system as set forth in claim 2, wherein the correction value $\theta_{r-\Delta v}$ provides a correction angle having a phase opposite the steered angle of the front wheels as values of $\Delta V$ and $\Delta \dot{V}$ become greater, where $\Delta V =$ the difference in rotational speeds of the driven wheels of compliance wheels of the vehicle and $\Delta \dot{V} =$ change of $\Delta V$ between the present steering control cycle and a previous steering control cycle.

4. A system as set forth in claim 3, wherein said sixth means is responsive to the operation of said fifth means for holding the correction value to zero.

5. A system as set forth in claim 3, wherein said sixth means is responsive to the operation of said fifth means for retaining the correction value to a value that was derived one steering control cycle before the present cycle.

6. A system as set forth in claim 1, wherein said fifth means includes a throttle valve which is operable to be responsive to said difference in rotational speeds between the front and rear wheels being greater than said preselected reference value to reduce engine output, said sixth means being responsive to the operation of the throttle valve for holding a correction value for the rear wheel steering angle to zero and deriving the rear wheel steering angle determined by said third means as the rear wheel target steering angle.

7. A system as set forth in claim 6, wherein said fifth means determines a correction value for an opening of the throttle valve based on the difference in rotational speeds between the front and rear wheels ($\Delta V$) and a variation in value of a function of $\Delta V$, ($\Delta \dot{V}$), where $\Delta \dot{V}$ = change of $\Delta V$ between the steering control cycle and a previous steering control cycle when $\Delta V$ is greater than the preselected reference value.

8. A system as set forth in claim 1, wherein said fourth means derives the rear wheel target steering angle $\theta_r$ according to the following relation, $$\theta_r = K \times \theta - T \times \dot{\theta}$$

where
K: K' − ΔK
  K': a coefficient of a reference characteristic of rear wheel steering variable, according to vehicle speed
  $\theta$: a steered angle of a steering wheel
  $\dot{\theta}$: steering angular velocity of a steering wheel
  ΔK: a correction for a rear wheel steering angle
  T: a coefficient variable dependent upon the vehicle speed.

9. A rear wheel steering control system for a vehicle comprising:
first means for monitoring a steered angle of front wheels for deriving a signal indicative thereof;
second means including sensors for monitoring rotational speeds of wheels and determining a difference in rotational speeds between the front and rear wheels and the vehicle speed and for deriving signals indicative thereof;
third means for determining a rear wheel steering angle having a preselected relation to the steered angle of the front wheels and the vehicle speed for deriving a signal indicative thereof;
fourth means responsive to generation of a difference in rotational speeds between the front and rear wheels for deriving a correction value for the rear wheel steering angle determined by said third means in a preselected relation to a degree of difference in rotational speeds between the front and rear wheels and deriving a rear wheel target steering angle;
fifth means for controlling traction of driven wheels of the vehicle so as to compensate for the difference in rotational speeds between the front and rear wheels when a value representing the difference in rotational speeds between the front and rear wheels is greater than a reference value;
sixth means for holding the correction value to zero during traction control of driven wheels by said fifth means; and
seventh means for controlling an actual steering angle of the rear wheel according to the rear wheel target steering angle.

10. A system as set forth in claim 9, wherein said fifth means includes a throttle valve which is operable to reduce an engine output torque when said value representing the difference in rotational speeds between the front and rear wheels becomes greater than said preselected reference value.

11. A system as set forth in claim 10, wherein said fifth means determines a correction value for the throttle valve opening so as to compensate the difference in rotational speeds between the front and rear wheels.

12. A combination of a rear wheel steering control system and a traction control system for a vehicle comprising:
first means for monitoring a steered angle of front wheels to provide a signal indicative thereof;
second means including sensors for monitoring rotational speeds of wheels for determining a difference in rotational speeds between the front and rear wheels and the vehicle speed and for deriving signals indicative thereof;
third means for determining a rear wheel steering angle based on the steered angle of the front wheels and the vehicle speed for deriving a signal indicative thereof;
fourth means for compensating the rear wheel steering angle determined by said third means based on the difference in rotational speeds between the front and rear wheels for deriving a rear wheel target steering angle;
fifth means responsive to the difference in rotational speeds between the front and rear wheels being greater than a preselected reference value for restricting the compensating operation of said fourth means and driving the rear wheel steering angle as determined by said third means as the rear wheel target steering angle; and
sixth means for controlling an actual steering angle of the rear wheel according to the rear wheel target steering angle.

13. A system as set forth in claim 12, wherein said fourth means derives the rear wheel target steering angle $\theta_r$ according to the following relation, $$\theta_r = Kv \times \theta_f + \theta_{r-\Delta v}$$

where Kv is a steering ratio of the rear wheel steering angle to the steered angle of the front wheels $\theta_f$ which is variable in a steering angle phase to that of $\theta_f$ dependent upon the vehicle speed and $\theta_{r-\Delta v}$ is a correction value for the rear wheel steering angle based on the difference in rotational speeds between the front and rear wheels.

14. A system as set forth in claim 13, wherein the correction value $\theta_{r-\Delta v}$ provides a correction angle having a phase opposite the steered angle of the front wheels as values of $\Delta V$ and $\Delta \dot{V}$ become greater, where $\Delta V$ = the difference in rotational speeds of the driven wheels of compliance wheels of the vehicle and $\Delta \dot{V}$ = change of $\Delta V$ between the present steering control cycle and a previous steering control cycle.

15. A system as set forth in claim 14, wherein said fifth means restricts the compensating operation of said fourth means for holding the correction value to zero.

16. A system as set forth in claim 14, wherein said fifth means retains the correction value to a value that was derived one steering control cycle before the present cycle.

17. A method of controlling rear wheel steering of a vehicle comprising:
   monitoring a steered angle of front wheels of the vehicle;
   monitoring rotational speeds of front and rear wheels of the vehicle;
   responding to the monitored speeds to determine (a) the difference in rotational speeds of the front and rear wheels and (b) speed of the vehicle;
   determining rear wheel steering angle based on the steered angle of the front wheels and the vehicle speed;
   compensating the rear wheel steering angle determined during the previous step based on the difference in rotational speeds between the front and rear wheels to derive a rear wheel target steering angle;
   responding to the difference in rotational speeds between the front and rear wheels being greater than a preselected reference value to control traction of driven wheels of the vehicle so as to compensate for the difference in rotational speeds between the front and rear wheels;
   responding to the traction control to restrict said compensating operation and derive the rear wheel target steering angle as determined by the steered angle of the front wheels and the vehicle speed; and
   controlling the actual steering angle of the rear wheel according to the rear wheel target steering angle.

18. The method of claim 17 wherein said rear wheel target steering angle, $\theta_r$, is derived according to the following relation, $$\theta_r = Kv \times \theta_f + \theta_{r-\Delta v}$$

where Kv is a steering ratio of the rear wheel steering angle to the steered angle of the front wheels $\theta_f$ which is variable in a steering angle phase to that of $\theta_f$ dependent upon the vehicle speed and $\theta_{4-\Delta v}$ is a correction value for the rear wheel steering angle based on the difference in rotational speeds between the front and rear wheels.

19. The method of claim 18 wherein the correction value $\theta_{r-\Delta v}$ provides a correction angle having phase opposite the steered angle of the front wheels as values of $\Delta V$ and $\Delta \dot{V}$ become greater, where $\Delta V$ = the difference in rotational speeds between the front and rear wheels of the vehicle and $\Delta \dot{V}$ = change of $\Delta V$ between the present steering control cycle and a previous steering control cycle.

20. The method of claim 19 wherein the correction value is held to zero in response to the difference in rotational speeds exceeding a referenced value.

21. The method of claim 19 wherein the compensating operation responds to the difference in rotational speeds exceeding the referenced value to retain the correction value at a value that was derived one steering control cycle before the present cycle.

22. The method of claim 17 wherein said traction is controlled by operating a throttle valve in response to said difference in rotational speeds between the front and rear wheels being greater than said preselected reference value to reduce engine output, the compensating operation being responsive to the operation of the throttle valve to hold a correction value for the rear wheel steering angle to zero and derive the rear wheel steering angle determined in response to the derived rear wheel target steering angle.

23. The method of claim 22 wherein a correction value for opening of the throttle valve is based on the difference in rotational speeds between the front and rear wheels ($\Delta V$) and a variation in a value of a function of ($\Delta \dot{V}$) when $\Delta V$ is greater than the preselected reference value, $\Delta \dot{V}$ is a time rate of change of $\Delta V$.

24. The method of claim 17 wherein the rear wheel target steering angle $\theta_r$ is derived according to the following relation, $$\theta_r = K \times \theta - T \times \dot{\theta}$$

where
   $K = K' - \Delta K$
   $K'$ = a coefficient of a reference characteristic of rear wheel steering variable, according to vehicle speed
   $\theta$ = a steered angle of a steering wheel
   $\dot{\theta}$ = steering angular velocity of a steering wheel
   $\Delta K$ = a correction for a rear wheel steering angle
   $T$ = a variable coefficient dependent upon the vehicle speed.

25. A rear wheel steering control system for a vehicle comprising:
   first means for monitoring a steered angle of front wheels of the vehicle and deriving a signal indicative thereof;
   sensors for monitoring rotational speeds of wheels of the vehicle and deriving signals indicative thereof;
   means for controlling an actual steering angle of the rear wheels according to a rear wheel target steering angle; and
   means responsive to all said signals for activating said control means; said activating means: (a) determining a difference in rotational speeds between the front and rear wheels and speed of the vehicle to derive signals indicative thereof; (b) determining a rear wheel steering angle based on the steered angle of the front wheels and the vehicle speed for deriving a signal indicative thereof; (c) compensating the determined rear wheel steering angle based on the difference in rotational speeds between the front and rear wheels for deriving said rear wheel target steering angle; (d) responding to the difference in rotational speeds between the front and rear wheels being greater than a preselected reference value for controlling traction of driven wheels of the vehicle so as to compensate for the difference in rotational speeds between the front and rear wheels; and (e) responding to the traction control operation to restrict said compensating operation and derive the rear wheel steering angle as determined by the steered angle of the front wheels and the vehicle speed.

26. The system of claim 25 wherein said rear wheel target steering angle, $\theta_r$, is derived according to the following relation, $$\theta_r = Kv \times \theta_f + \theta_{r-\Delta v}$$

where Kv is a steering ratio of the rear wheel steering angle to the steered angle of the front wheels $\theta_f$ which is variable in a steering angle phase to that of $\theta_f$ dependent upon the vehicle speed and $\theta_{r-\Delta v}$ is a correction value for the rear wheel steering angle based on the difference in rotational speeds between the front and rear wheels.

27. The system of claim 26 wherein the correction value $\theta_{r-\Delta v}$ provides a correction angle having phase opposite the steered angle of the front wheels as values of $\Delta V$ and $\Delta \dot{V}$ become greater, where $\Delta V=$ the difference in rotational speeds between the front and rear wheels of the vehicle and $\Delta \dot{V}=$ change of $\Delta V$ between the present steering control cycle and a previous steering control cycle.

28. The system of claim 27 wherein the correction value is held to zero in response to the difference in rotational speeds exceeding a referenced value.

29. The system of claim 27 wherein the compensating operation responds to the difference in rotational speeds exceeding the referenced value to retain the correction value at a value that was derived one steering control cycle before the present cycle.

30. The system of claim 25 wherein said activating means includes a throttle valve which is operable to be responsive to said difference in rotational speeds between the front and rear wheels being greater than said preselected reference value to reduce engine output, said activating means being responsive to the operation of the throttle valve for holding a correction value for the rear wheel steering angle to zero and deriving the rear wheel steering angle determined as the rear wheel target steering angle.

31. The system of claim 30 wherein said activating means determines a correction value for opening of the throttle valve is based on the difference in rotational speeds between the front and rear wheels ($\Delta V$) and a variation in a value of a function of ($\Delta \dot{V}$) when $\Delta V$ is greater that the preselected reference value, $\Delta \dot{V}$ is a time rate of change of $\Delta V$.

32. The system of claim 25 wherein the rear wheel target steering angle $\theta_r$ is derived according to the following relation, $$\theta_r = K \times \theta - T \times \dot{\theta}$$

where
$K = K' - \Delta K$

K' = a coefficient of a reference characteristic of rear wheel steering variable, according to vehicle speed
$\theta$ = a steered angle of a steering wheel
$\dot{\theta}$ = steering angular velocity of a steering wheel
$\Delta K$ = a correction for a rear wheel steering angle
T = a coefficient variable dependent upon the vehicle speed.

33. A method of controlling rear wheel steering of a vehicle comprising:
monitoring a steered angle of front wheels of the vehicle;
monitoring rotational speeds of front and rear wheels of the vehicle;
responding to the monitored speeds to determine (a) the difference in rotational speeds of the front and rear wheels and (b) speed of the vehicle;
determining a rear wheel steering angle as a preselected relation to the steered angle of the front wheels and the vehicle speed;
responding to the difference in rotational speeds between the front and rear wheels to derive a correction value for the rear wheel steering angle determined in response to the steered angle of the front wheels and the vehicle speed in a preselected relation to a degree of difference in rotational speed between the front and rear wheels to derive a rear wheel target steering angle;
controlling traction of driven wheels of the vehicle so as to compensate for the difference in rotational speeds between the front and rear wheels when a value representing the difference in rotational speeds between the front and rear wheels is greater than a reference value;
holding the correction value to zero during the traction control step of the driven wheels; and
controlling the actual steering angle of the rear wheels according to the rear wheel target steering angle.

34. The method of claim 33 wherein the traction is controlled by operating a throttle valve to reduce an engine output when the difference in rotational speeds between the front and rear wheels becomes greater than said preselected reference value.

35. The method of claim 34 wherein the correction value for the throttle value opening is determined to compensate for the difference in rotational speeds between the front and rear wheels.

36. A method of controlling rear wheel steering of a vehicle comprising:
monitoring a steered angle of front wheels of the vehicle;
monitoring rotational speeds of front and rear wheels of the vehicle;
responding to the monitored speeds to determine (a) the difference in rotational speeds of the front and rear wheels and (b) speed of the vehicle;
determining rear wheel steering angle based on the steered angle of the front wheels and the vehicle speed;
compensating the rear wheel steering angle determined during the previous step based on the difference in rotational speeds between the front and rear wheels to derive a rear wheel target steering angle;
responding to the difference in rotational speeds between the front and rear wheels being greater than a preselected reference value to restrict the compensating operation and derive the rear wheel target steering angle as determined by the steered angle of the front wheels and the vehicle speed; and
controlling the actual steering angle of the rear wheels according to the derived rear wheel target steering angle.

37. The method of claim 36 wherein the rear wheel target steering angle $\theta_r$ is determined according to the following relation, $$\theta_r = Kv \times \theta_f + \theta_{-\Delta v}$$

where Kv is a steering ratio of the rear wheel steering angle to the steered angle of the front wheels $\theta_f$ which is variable in a steering angle phase to that of $\theta_f$ dependent upon the vehicle speed and $\theta_{r-\Delta v}$ is a correction value for the rear wheel steering angle based on the difference in rotational speeds between the front and rear wheels.

38. The method of claim 37 wherein the correction value $\theta_{r-\Delta v}$ provides a correction angle having a phase opposite the steered angle of the front wheels as values of $\Delta v$ and $\Delta \dot{V}$ become greater, where $\Delta V=$ the difference in rotational speeds between the front and rear wheels of the vehicle and $\Delta \dot{V}$ = change of $\Delta v$ between the present steering control cycle and a previous steering control cycle.

39. The method of claim 38 wherein the compensating operation holds the correction value to zero.

40. The method of claim 38 wherein the correction value is maintained at a value that was derived one steering control cycle before the present cycle.

41. A rear wheel steering control system for a vehicle comprising:
  first means for monitoring a steered angle of front wheels of the vehicle and deriving a signal indicative thereof;
  sensors for monitoring rotational speeds of wheels of the vehicle and deriving signals indicative thereof;
  means for controlling an actual steering angle of the rear wheels according to a rear wheel target steering angle;
  control means for traction of driven wheels of the vehicle; and
  means responsive to all said signals for activating said control means; said activating means: (a) determining the difference in rotational speeds between the front and rear wheels and the speed of the vehicle to derive signals indicative thereof; (b) determining a rear wheel steering angle based on a preselected relation of the steered angle of the front wheels and the vehicle speed to provide a signal indicative thereof; (c) responding to the difference in rotational speeds between the front and rear wheels for deriving a correction value for the rear wheel steering angle determined by said preselected relation to the steered angle of the front wheels and the vehicle speed in a preselected relation to a degree of difference in rotational speeds between the front and rear wheels and deriving said rear wheel target steering angle; (d) controlling traction of the driven wheels so as to compensate for the difference in rotational speeds between the front and rear wheels when a value representing the difference in rotational speeds between the front and rear wheels is greater than a reference value; and (3) holding the correction value to zero during the traction control operation for the driven wheels.

42. The system of claim 41 wherein said activating means derives the rear wheel target steering angle $\theta_r$ according to the following relation, $$\theta_r = Kv \times \theta_f + \theta_{r-\Delta v}$$

where Kv is a steering ratio of the rear wheel steering angle to the steered angle of the front wheels $\theta_f$ which is variable in a steering angle phase to that of $\theta_f$ dependent upon the vehicle speed and $\theta_{r-\Delta v}$ is a correction value for the rear wheel steering angle based on the difference in rotational speeds between the front and rear wheels.

43. The system of claim 42 wherein the correction value $\theta_{r-\Delta v}$ provides a correction angle having a phase opposite the steered angle of the front wheels as values of $\Delta V$ and $\Delta \dot{V}$ become greater, where $\Delta V$ = the difference in rotational speeds between the front and rear wheels of the vehicle and $\Delta \dot{V}$ = change of $\Delta V$ between the present steering control cycle and a previous steering control cycle.

44. The system of claim 43 wherein said activating means restricts the compensating operation for holding the correction value to zero.

45. The system of claim 43 wherein said activating means retains the correction value to a value that was derived one steering control cycle before the present cycle.

46. A combination rear wheel steering control systems and traction control system for a vehicle comprising:
  first means for monitoring a steered angle of front wheels of the vehicle and deriving a signal indicative thereof;
  sensors for monitoring rotational speeds of wheels of the vehicle and deriving signals indicative thereof;
  means for controlling an actual steering angle of the rear wheels according to a rear wheel target steering angle;
  means for controlling traction of the vehicle;
  means responsive to all said signals for activating said control means; said activating means: (a) determining the difference in rotational speeds between the front and rear wheels and the speed of the vehicle to derive signals indicative thereof; (b) determining a rear wheel steering angle based on the steered angle of the front wheels and the vehicle speed for deriving a signal indicative thereof; (c) compensating the determined rear wheel steering angle based on the difference in rotational speeds between the front and rear wheels to provide said rear wheel target steering angle; (d) responding to the difference in rotational speeds between the front and rear wheels being greater than a preselected reference value for restricting the compensating operation and deriving the rear wheel steering angle as determined by the steered angle of the front wheels and the vehicle speed.

47. The system of claim 46 wherein said activating means derives the rear wheel target steering angle $\theta_r$ according to the following relation, $$\theta_r = Kv \times \theta_f + \theta_{r-\Delta v}$$

where Kv is a steering ratio of the rear wheel steering angle to the steered angle of the front wheels $\theta_f$ which is variable in a steering angle phase to that of $\theta_f$ dependent upon the vehicle speed and $\theta_{r-\Delta v}$ is a correction value for the rear wheel steering angle based on the difference in rotational speeds between the front and rear wheels.

48. The system of claim 47 wherein the correction value $\theta_{r-\Delta v}$ provides a correction angle having a phase opposite the steered angle of the front wheels as values of $\Delta V$ and $\Delta \dot{V}$ become greater, where $\Delta V$ = the difference in rotational speeds between the front and rear wheels of the vehicle and $\Delta \dot{V}$ = change of $\Delta V$ between the present steering control cycle and a previous steering control cycle.

49. The system of claim 48 wherein said activating means restricts the compensating operation of said fourth means for holding the correction value to zero.

50. The system as set forth in claim 48 wherein said activating means retains the correction value to a value that was derived one steering control cycle before the present cycle.

* * * * *